(12) United States Patent
McGreevy

(10) Patent No.: US 8,245,949 B2
(45) Date of Patent: Aug. 21, 2012

(54) ENERGY CONSERVATION SYSTEM FOR USING HEAT FROM AIR CONDITIONING UNITS TO HEAT WATER SUPPLY LINES

(75) Inventor: Andrew McGreevy, Petoskey, MI (US)

(73) Assignee: Grand Hotel, LLC, Okemos, MI (US)

( * ) Notice: Subject to any disclaimer, the term of this patent is extended or adjusted under 35 U.S.C. 154(b) by 957 days.

(21) Appl. No.: 12/137,089

(22) Filed: Jun. 11, 2008

(65) Prior Publication Data
US 2009/0026281 A1 Jan. 29, 2009

Related U.S. Application Data

(60) Provisional application No. 60/951,747, filed on Jul. 25, 2007.

(51) Int. Cl.
*F24D 3/08* (2006.01)
*F25B 27/00* (2006.01)
(52) U.S. Cl. ......................................... 237/19; 62/238.6
(58) Field of Classification Search .................... 237/19; 62/238.6
See application file for complete search history.

(56) References Cited

U.S. PATENT DOCUMENTS

| | | | | |
|---|---|---|---|---|
| 1,240,101 A | * | 9/1917 | Thompson | 237/19 |
| 2,481,720 A | * | 9/1949 | Campbell | 237/19 |
| 2,551,758 A | * | 5/1951 | Newton | 62/184 |
| 2,575,325 A | * | 11/1951 | Ambrose et al. | 62/238.6 |
| 2,632,306 A | * | 3/1953 | Ruff | 62/238.6 |
| 3,635,046 A | | 1/1972 | Sato et al. | |
| 3,651,864 A | | 3/1972 | Maddox, Jr. | |
| 3,922,876 A | * | 12/1975 | Wetherington et al. | 62/238.6 |
| 3,976,123 A | * | 8/1976 | Davies | 62/238.6 |
| 4,055,963 A | * | 11/1977 | Shoji et al. | 62/238.6 |
| 4,141,222 A | * | 2/1979 | Ritchie | 237/2 B |
| 4,142,379 A | | 3/1979 | Kuklinski | |
| 4,226,606 A | | 10/1980 | Yaeger et al. | |
| 4,241,588 A | | 12/1980 | Murphy et al. | |
| 4,246,764 A | | 1/1981 | Papadakos | |
| 4,277,952 A | | 7/1981 | Martinez, Jr. | |
| 4,281,519 A | * | 8/1981 | Spath et al. | 237/19 |
| 4,459,816 A | * | 7/1984 | Lung et al. | 62/238.6 |
| 4,487,032 A | | 12/1984 | Speicher | |
| 4,592,206 A | * | 6/1986 | Yamazaki et al. | 62/238.6 |

(Continued)

FOREIGN PATENT DOCUMENTS

JP 2002327939 11/2002

(Continued)

*Primary Examiner* — Steven B McAllister
*Assistant Examiner* — Phillip E Decker
(74) *Attorney, Agent, or Firm* — Dickinson Wright, PLLC; Harold W. Milton, Jr.

(57) ABSTRACT

A hot water circuit (50) supplies water to a plurality of rooms (20) in a building from a central water source (22). Each room (20) has dispenser (24) and an air conditioner (28) and a liquid heat exchanger (38). The air conditioner (28) includes a condenser (30) that abuts the liquid heat exchanger (38) for warming the water from the central water source (22). When too much water is heated, some returns to the central water source (22). Some water is cooled by a dissipating heat exchanger (76, 74) disposed on a heated water return line (70). The return line (70) is connected to the central water source (22). An auxiliary system (84) runs through the dissipating heat exchanger (76, 74) to cool the water in the return line (70).

14 Claims, 1 Drawing Sheet

U.S. PATENT DOCUMENTS

| | | |
|---|---|---|
| 4,680,941 A | 7/1987 | Richardson et al. |
| 4,744,220 A | 5/1988 | Kerner et al. |
| 5,117,652 A | 6/1992 | Takeuchi et al. |
| 5,467,604 A * | 11/1995 | Sekigami et al. ............... 62/117 |
| 5,495,723 A | 3/1996 | MacDonald |
| 5,560,216 A | 10/1996 | Holmes |
| 5,778,696 A | 7/1998 | Conner |
| 5,782,104 A | 7/1998 | Sami et al. |
| 5,906,104 A | 5/1999 | Schwartz et al. |
| 6,357,245 B1 * | 3/2002 | Weng et al. .................. 62/238.6 |
| 6,418,737 B1 | 7/2002 | Kuroki et al. |
| 6,467,289 B2 | 10/2002 | Kuroki et al. |
| 6,536,221 B2 | 3/2003 | James |
| 6,668,572 B1 * | 12/2003 | Seo et al. ..................... 62/238.6 |
| 7,234,646 B2 * | 6/2007 | Saitoh et al. .................. 237/2 B |
| 7,716,943 B2 * | 5/2010 | Seefeldt ....................... 62/324.6 |
| 2004/0237557 A1 | 12/2004 | Harmon et al. |
| 2010/0064710 A1 * | 3/2010 | Slaughter ..................... 62/238.6 |

FOREIGN PATENT DOCUMENTS

| | | |
|---|---|---|
| JP | 2004116868 | 4/2004 |

* cited by examiner

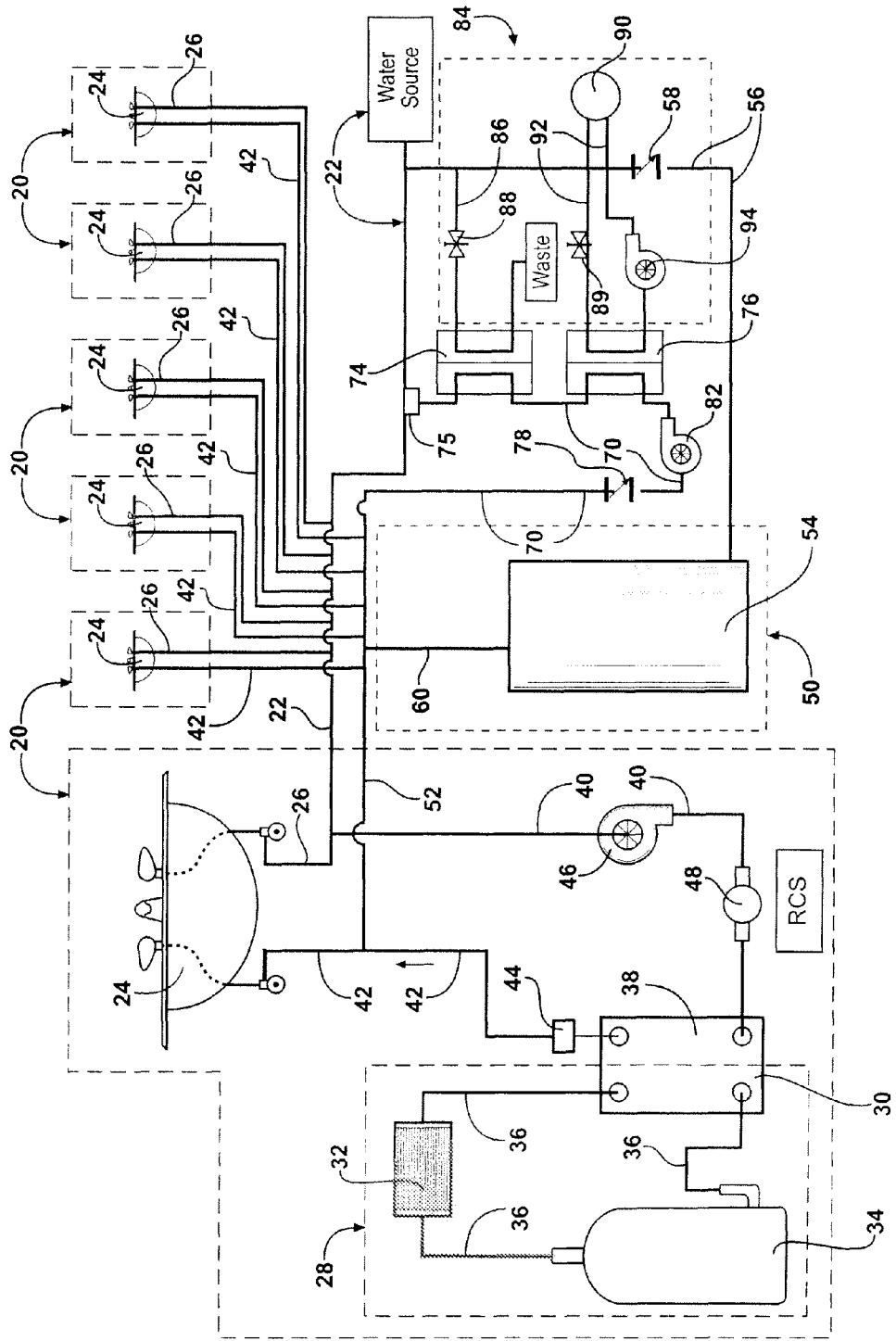

ENERGY CONSERVATION SYSTEM FOR USING HEAT FROM AIR CONDITIONING UNITS TO HEAT WATER SUPPLY LINES

CROSS REFERENCE TO RELATED APPLICATION

This application claims the benefit of U.S. provisional application No. 60/951,747 filed Jul. 25, 2007.

BACKGROUND OF THE INVENTION

1. Field of the Invention

The subject invention relates to an energy conservation system for a building comprising of multiple rooms with an independent air conditioning unit in each room.

2. Description of the Prior Art

Generally, energy conservation systems are well known where a heat exchanger of a refrigeration cycle heats water in a water line for uses outside of the refrigeration cycle. U.S. Pat. No. 4,680,941 granted to Richardson discloses a waste heating recovery system in which a central water source supplies water to a refrigeration system through a water supply line. A liquid heat exchanger is disposed in heat transfer relationship with the condenser of the refrigeration system and is connected to the water supply line for transferring heat from the air conditioner to the water from the water supply line to produce heated water.

U.S. Pat. No. 6,536,221 issued Mar. 25, 2003, discloses an air conditioning heat recovery system. This system includes an air conditioner for cooling a room and a water supply line for supplying water to the room. A heat exchanger is disposed in heat transfer relationship with the air conditioner in the room and connects to a water supply line for transferring heat from the air conditioner to the water from the water supply line to produce heated water. There is a need for continued efficiency in energy conservation systems.

SUMMARY OF THE INVENTION AND ADVANTAGES

The subject invention provides space cooling for individual rooms while simultaneously providing heated water for use throughout the entire building. In addition to energy conservation, the system is easily installed as the individual air conditioning units in each room facilitate the use of the domestic hot and cold water in the individual rooms and do not require a separate water source such as a chilled water loop or condenser water loop through the building.

BRIEF DESCRIPTION OF THE DRAWINGS

Other advantages of the present invention will be readily appreciated, as the same becomes better understood by reference to the following detailed description when considered in connection with the accompanying drawing wherein FIG. 1 is a schematic of the disclosed invention.

DETAILED DESCRIPTION OF THE INVENTION

Referring to the FIGURE, an energy conservation system is illustrated for a building having multiple rooms 20, generally indicated, and for a central water source 22 for supplying central water to the rooms 20 of the building. A water dispenser 24 is disposed in each of the rooms 20. The dispenser 24 may include a sink and/or shower. An independent water supply line 26 is interconnected with the central water source 22 and the dispenser 24 in each of the rooms 20 and supplies central water to each of the dispensers 24.

An independent air conditioner 28, generally indicated, is disposed in each of the rooms 20 and generates cool air in each of the rooms 20 independently of one another. Each of the air conditioners 28 include a condenser 30 and an evaporator 32 and a compressor 34, all interconnected by a refrigerant line 36 for circulating refrigerant in each of the air conditioners 28. An independent liquid heat exchanger 38 is in each of the rooms 20 and is disposed in heat transfer relationship with the condenser 30 of the air conditioner 28. The condenser 30 physically abuts the liquid heat exchanger 38 for transferring heat from the condenser 30 to the heat exchanger, as it is well known in the art. An exchanger water supply line 40 is disposed in each of the rooms 20 and is connected to the central water source 22 for supplying water to the liquid heat exchanger 38 to heat water running through the liquid heat exchanger 38 to produce heated water.

An independent heated water line 42 is disposed in each of the rooms 20 and extends from the liquid heat exchanger 38 in the room 20 to the dispenser 24 in the room 20. An independent sensing element 44 is disposed in the independent heated water line 42 of the room 20 and senses the temperature of the heated water from the liquid heat exchanger 38 in the room 20. An independent room water pump 46 is disposed in the exchanger water supply line 40 of the room 20 and is responsive to the sensing element 44 for pumping water from the central water source 22 through the liquid heat exchanger 38 in the room 20. An independent regulating valve 48 is disposed in the exchanger water supply line 40 between the water pump 46 and the liquid heat exchanger 38 of the room 20 and is responsive to the sensing element 44 of the room 20 for regulating the flow of water to the liquid heat exchanger 38 in the room 20 to maintain the temperature of the heated water below a predetermined temperature.

A regulatory control system RCS modulates the regulating valve 48 between open and closed in response to the sensing element 44 sensing the temperature of the independent heated water line 42 to be within a predetermined temperature.

A central hot water circuit 50, generally indicated, includes a hot water line 52 for supplying hot water to all of the independent heated water lines 42 in the rooms. The hot water line 52 is connected to the heated water line 42. Hence, heated water from the liquid heat exchanger 38 may supply heated water to any of the dispensers 24 via the hot water line 52. The central hot water circuit 50 includes at least one water heater 54 for supplying hot water. A heater inlet line 56 connects the water heater 54 to the central water source 22. A heater inlet check valve 58 is disposed in the heater inlet line 56 and prevents reversal of the water flow. A heater outlet line 60 connects the water heater 54 to the hot water line 52 and all of the independent heated water lines 42 and to all of the dispensers 24 in all of the rooms.

A heated water return line 70 is connected to the water source 22 and the hot water line 52. A dissipating heat exchanger 76, 74 is disposed in the heated water return line 70 between the hot water line 52 and the water source 22 for cooling water in the heated water return line 70. A heated water return check valve 78 is disposed in the heated water return line 70 and prevents reversal of the water flow.

At a point when the air conditioners 28 are in operation and producing more heated water than is being used by the dispensers 24, the combined pressure of the water being pumped through the water pumps 46 raises the water pressure in the hot water line 52 above the pressure of the water source 22. This pressure differential in turn closes check valve 58 and opens check valve 78 allowing the excess heated water to flow from the hot water line 52 through the heated water return line 70 and through the heat exchangers 76, 74. The water is cooled and returned to the water source 22.

An overheat sensing element 75 is disposed in the heated water return line 70 for sensing the temperature of the water leaving the dissipating heat exchanger 76, 74. An overheat water pump 82 may be included in the heated water return line 70 but is not necessary.

An auxiliary system 84, generally indicated in FIG. 1, runs water through the dissipating heat exchanger 76, 74 to transfer heat from the heated water to the auxiliary system 84. A control valve 88, 89 controls the flow of water from the auxiliary system to the dissipating heat exchanger 76, 74.

The dissipating heat exchanger 76, 74 may also include a heat dissipating medium 90 for cooling the heated water return line 70. The heat dissipating medium 90 may include a cooling tower, underground cooling loop, lake water or any other means for heat dissipation. A primary dissipating heat exchanger 76 is disposed on the heated water return line 70 for cooling the line 70. Also, a cooling line 92 runs water through the primary dissipating heat exchanger 76 from the heat dissipating medium 90 to transfer heat from the return line 70 to the cooling line 92. A primary control valve 89 is movable between open and closed positions and is disposed in the cooling line 92 and is responsive to a the overheat sensing element 75 sensing a predetermined temperature of the return line 70 to maintain the water temperature of the return line 70 within a predetermined range. A circulating pump 94 is disposed in the cooling line 92 for controlling the flow of water from the medium 90.

The dissipating heat exchanger 76, 74 may include a secondary dissipating heat exchanger 74 disposed on the return line 70 for cooling the return line 70. A heat absorption line 86 is connected to the water source 22 for running water from the water source 22 through the secondary dissipating heat exchanger 74 to a waste output. The waste output may be recycled by emptying into a pool or the like. A secondary control valve 88 is movable between open and closed positions and is disposed in said heat absorption line 92 and is responsive to the overheat sensing element 75 sensing a predetermined temperature of the return line 70 to maintain the water temperature of the return line 70 within a predetermined range. The system may operate with one or both of the dissipating heat exchangers 74, 76, but only one is necessary.

The control valves 88, 89 are opened when the water temperature of the overheat line, sensed by the overheat sensing element 75, is above the predetermined temperature. By opening the control valves 88, 89, cool water from the auxiliary system 84 cools the water of the return line 70. If the water temperature sensed by the overheat sensing element 75 is below the predetermined temperature, the control valves 88, 89 are closed.

The subject invention provides space cooling for individual rooms while simultaneously providing heated water for use throughout the entire building. In addition to energy conservation, the system is easily installed as the individual air conditioning units 26 in each room facilitate the use of the domestic hot and cold water in the individual rooms 20 and do not require a separate water source such as a chilled water loop or condenser water loop through the building.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An energy conservation system comprising:
   a building having a plurality of rooms (20),
   a central water source (22) for supplying central water to said building,
   an independent water supply line (26) interconnecting said central water source (22) and each of said rooms (20) for supplying water from said central water source (22) to each of said rooms (20),
   an independent air conditioner (28) in each of said rooms (20) for generating cool air in each of said rooms (20) independently of one another,
   an independent liquid heat exchanger (38) in each of said rooms (20) and disposed in heat transfer relationship with said air conditioner (28) in said room (20) and connected to said water supply line (26) for said room (20) for transferring heat from said air conditioner (28) to water from said water supply line (26) to produce heated water,
   a central hot water circuit (50) for supplying hot water to said rooms (20),
   a heated water return line (70) in fluid communication with said liquid heat exchanger (38) and said central water source (22) for diverting said heated water from said liquid heat exchanger (38) back to said central water source (22) in response to an increase of the pressure of said heated water above the pressure of the water source (22),
   a dissipating heat exchanger (76, 74) disposed in said heated water return line (70) for cooling said heated water received from said liquid heat exchanger (38),
   an auxiliary system (84) for running a cooling medium through said dissipating heat exchanger (76, 74) to transfer heat from said heated water return line (70) to said auxiliary system (84),
   said auxiliary system including a heat absorption line (86, 92) extending through said dissipating heat exchanger (76, 74) to an outlet independent of said independent water supply line (26) and said hot water circuit (50) and said heated water return line (70) and said central water source (22) for running the cooling medium through said dissipating heat exchanger (76, 74) to independently transfer heat from said return line (70) to the cooling medium in said heat absorption line (86, 92), and
   a control valve (88, 89) for controlling the flow of the cooling medium through said dissipating heat exchanger (76, 74) in response to a predetermined temperature of the water in said heated water return line (70).

2. A system as set forth in claim 1 including an overheat sensing element (75) disposed in said return line (70) for sensing the predetermined temperature for controlling said control valve (88, 89).

3. A system as set forth in claim 2 wherein said dissipating heat exchanger (76, 74) is disposed in said return line (70) for cooling said return line (70) and wherein said auxiliary system (84) includes a source of the cooling medium (22, 90) and said heat absorption line (86, 92) runs the cooling medium through said dissipating heat exchanger (76, 74) from said source of the cooling medium (22, 90) to transfer heat from said return line (70) to said heat absorption line (86, 92) and wherein said control valve (88, 89) is opened in response to said overheat sensing element (75) sensing the water temperature of said return line (70) to be above the predetermined temperature and said control valve (88, 89) is closed in response to said overheat sensing element (75) sensing the water temperature of said return line (70) to be below the predetermined temperature.

4. A system as set forth in claim 3 wherein said dissipating heat exchanger (76, 74) includes a secondary dissipating heat exchanger (74) disposed on said return line (70) for cooling said return line (70) and wherein said source of the cooling medium (22, 90) is said water source (22) and said heat absorption line (86) runs water from said water source (22) through said secondary dissipating heat exchanger (74) to a waste output and wherein said control valve (88, 89) includes a secondary control valve (88) disposed in said heat absorption line (86).

5. A system as set forth in claim 1 wherein said central hot water circuit (50) includes at least one water heater (54) for supplying hot water and a heater inlet line (52, 56) connecting said water heater (54) to said central water source (22) and a heater outlet line (60) connecting said water heater (54) to all of said independent heated water lines (42) in all of said rooms (20) and including a hot water line (52) for supplying hot water to all of said independent heated water lines (42).

6. A system as set forth in claim 5 including a heater inlet check valve (58) disposed in said heater inlet line (56) for allowing water to flow from said central water source (22) through said heater inlet line (56) and preventing the reversal of water flow.

7. A system as set forth in claim 6 wherein said dissipating heat exchanger (76, 74) is disposed in said return line (70) between said water source (22) and said hot water line (52) and said heated water return line (70) is connected to said hot water line (52).

8. A system as set forth in claim 7 including an overheat water pump (82) disposed in said return line (70) for pumping heated water through said dissipating heat exchanger (76, 74) and a heated water return check valve (78) disposed in said heated water return line (70) for allowing water to flow through said heated water return line (70) and preventing the reversal of water flow.

9. A system as set forth in claim 1 including a water dispenser (24) in each of said rooms (20) for dispensing water in each of said rooms (20) and an independent liquid heat exchanger (38) in each of said rooms (20) and an independent heated water line (42) for each of said rooms (20) and extending from said liquid heat exchanger (38) in said room (20) to said dispenser (24) in said room (20) for supplying the heated water from said liquid heat exchanger (38) to said dispenser (24) in said room (20).

10. A system as set forth in claim 8 wherein said air conditioner (28) includes a condenser (30) and an evaporator (32) and a compressor (34) for circulating refrigerant in each of said air conditioners (28) and said independent liquid heat exchanger (38) is disposed in heat transfer relationship with said condenser (30) of said air conditioner (28) in said room (20).

11. A system as set forth in claim 10 including an exchanger water supply line (40) connected to said independent water supply line (26) in each of said rooms (20) for supplying water to said liquid heat exchanger (38) to heat water in said liquid heat exchanger (38) to produce heated water and an independent sensing element (44) for each of said rooms (20) and disposed in said independent heated water line (42) in said room (20) for sensing the temperature of the heated water from said liquid heat exchanger (38) in said room (20) and an independent room water pump (46) for each of said rooms (20) and disposed in said water supply line (26) of said room (20) and responsive to said sensing element (44) for pumping water from said independent water supply line (26) through said liquid heat exchanger (38) for said room (20).

12. A system as set forth in claim 11 including an independent regulating valve (48) for each of said rooms (20) disposed in said water supply line (26) between said water pump (46) and said liquid heat exchanger (38) of said room (20) and responsive to said sensing element (44) for said room (20) for regulating the flow of water to said liquid heat exchanger (38) in said room (20) to maintain the temperature of the heated water below a predetermined temperature.

13. An energy conservation system comprising:
a building having a plurality of rooms (20),
a central water source (22) for supplying central water to said building,
an independent water supply line (26) interconnecting said central water source (22) and each of said rooms (20) for supplying water from said central water source (22) to each of said rooms (20),
an independent air conditioner (28) in each of said rooms (20) for generating cool air in each of said rooms (20) independently of one another,
an independent liquid heat exchanger (38) in each of said rooms (20) and disposed in heat transfer relationship with said air conditioner (28) in said room (20) and connected to said water supply line (26) for said room (20) for transferring heat from said air conditioner (28) to water from said water supply line (26) to produce heated water,
a water dispenser (24) in each of said rooms (20) for dispensing water in each of said rooms (20),
an independent heated water line (42) extending from said liquid heat exchanger (38) to said dispenser (24) in each of said rooms for supplying the heated water from said liquid heat exchanger (38) to said dispenser (24),
a hot water circuit (50) including a central water heater (54) for supplying heated water to said dispenser (24) and a hot water line (52) extending from said central water heater (54) to said independent heated water line (42) and a heater inlet line (56) connecting said central water heater (54) to said central water source (22),
a heated water return line (70) fluidly connecting said hot water return line (52) and said central water source (22) for diverting said heated water from said liquid heat exchanger (38) back to said central water source (22) in response to an increase of the water in said hot water line (52) above the pressure of said central water source (22),
a dissipating heat exchanger (76, 74) disposed in said heated water return line (70) for cooling said heated water received from said liquid heat exchanger (38),
an auxiliary system (84) for running a cooling medium through said dissipating heat exchanger (76, 74) to transfer heat from said heated water return line (70) to said auxiliary system (84),
said auxiliary system including a heat absorption line (86, 92) extending through said dissipating heat exchanger (76, 74) to an outlet independent of said independent water supply line (26) and said hot water circuit (50) and said heated water return line (70) and said central water source (22) for running the cooling medium through said dissipating heat exchanger (76, 74) to independently transfer heat from said return line (70) to the cooling medium in said heat absorption line (86, 92),
a control valve (88, 89) for controlling the flow of the cooling medium through said dissipating heat exchanger (76, 74) in response to a predetermined temperature of the water in said heated water return line (70), and a heater inlet check valve (58) disposed in said hot water line (52) for preventing water from flowing from said hot water line (52) to said central water source (22) through said heater inlet line (56) for diverting said heated water through said heated water return line (70) and through said dissipating heat exchanger (76, 74) to be cooled and directed back to said central water source (22) in response to an increase of the water pressure in said hot water line (52) above the pressure of said water source (22).

14. A system as set forth in claim 3 wherein said dissipating heat exchanger includes a primary dissipating heat exchanger (76) disposed on said return line (70) for cooling said return line (70) and wherein said source of the cooling medium (90) and said heat absorption line (92) are in a closed circuit independent of said return line (70) and a circulating pump (94) is disposed in said heat absorption line (92) for pumping the cooling medium from said source of the cooling medium (90) through said dissipating heat exchanger (76) and back to said source of the cooling medium (90) and wherein said control valve (88, 89) includes a primary control valve (89) disposed in said heat absorption line (92).

\* \* \* \* \*